(12) United States Patent
Berry et al.

(10) Patent No.: US 8,064,220 B2
(45) Date of Patent: Nov. 22, 2011

(54) SYSTEM AND METHOD FOR ELECTRICAL COMMUNICATION THROUGH A NON-CONDUCTIVE INFORMATION HANDLING SYSTEM CHASSIS SURFACE

(75) Inventors: Chase Berry, Pflugerville, TX (US); Gary Thomason, Boulder Creek, CA (US); James Utz, Round Rock, TX (US); Steven L. Williams, Round Rock, TX (US); Jorge C. Marcet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 945 days.

(21) Appl. No.: 12/034,791

(22) Filed: Feb. 21, 2008

(65) Prior Publication Data

US 2009/0231788 A1 Sep. 17, 2009

(51) Int. Cl.
*H05K 7/14* (2006.01)
*H05K 7/18* (2006.01)
(52) U.S. Cl. .................... 361/799; 361/825; 361/816
(58) Field of Classification Search .................. 361/799, 361/800, 803, 816, 818, 212, 600, 679, 688, 361/704, 717, 752, 759, 809, 825, 807; 312/223.1, 312/223.2
See application file for complete search history.

(56) References Cited

U.S. PATENT DOCUMENTS

| | | | | |
|---|---|---|---|---|
| 4,473,204 A | * | 9/1984 | Bohm | 248/694 |
| 5,978,232 A | * | 11/1999 | Jo | 361/796 |
| 5,984,697 A | * | 11/1999 | Moran et al. | 439/92 |
| 6,166,324 A | * | 12/2000 | Oldendorf et al. | 174/377 |
| 6,544,047 B2 | * | 4/2003 | Moore | 439/95 |
| 7,005,573 B2 | | 2/2006 | Lionetta et al. | |
| 7,364,442 B2 | * | 4/2008 | Bang et al. | 439/92 |

OTHER PUBLICATIONS

<http://www.tech-etch.com/shield/fsgaskets.html>.

* cited by examiner

*Primary Examiner* — Hung S Bui
(74) *Attorney, Agent, or Firm* — Hamilton & Terrile, LLP; Robert W. Holland

(57) ABSTRACT

Electrical communication between an information handling system chassis having a non-conductive surface and processing components within the chassis is established through the non-conductive surface with conductive elements extending from a conductive pad. A protruding element extending from a conductive pad engages the conductive elements through the non-conductive surface when the protruding element is coupled to a cavity formed in the chassis. Alternatively, the protruding element extends from the chassis to couple to a cavity in the conductive pad. Processing components have electrical communication with the chassis through the conductive pad.

17 Claims, 4 Drawing Sheets

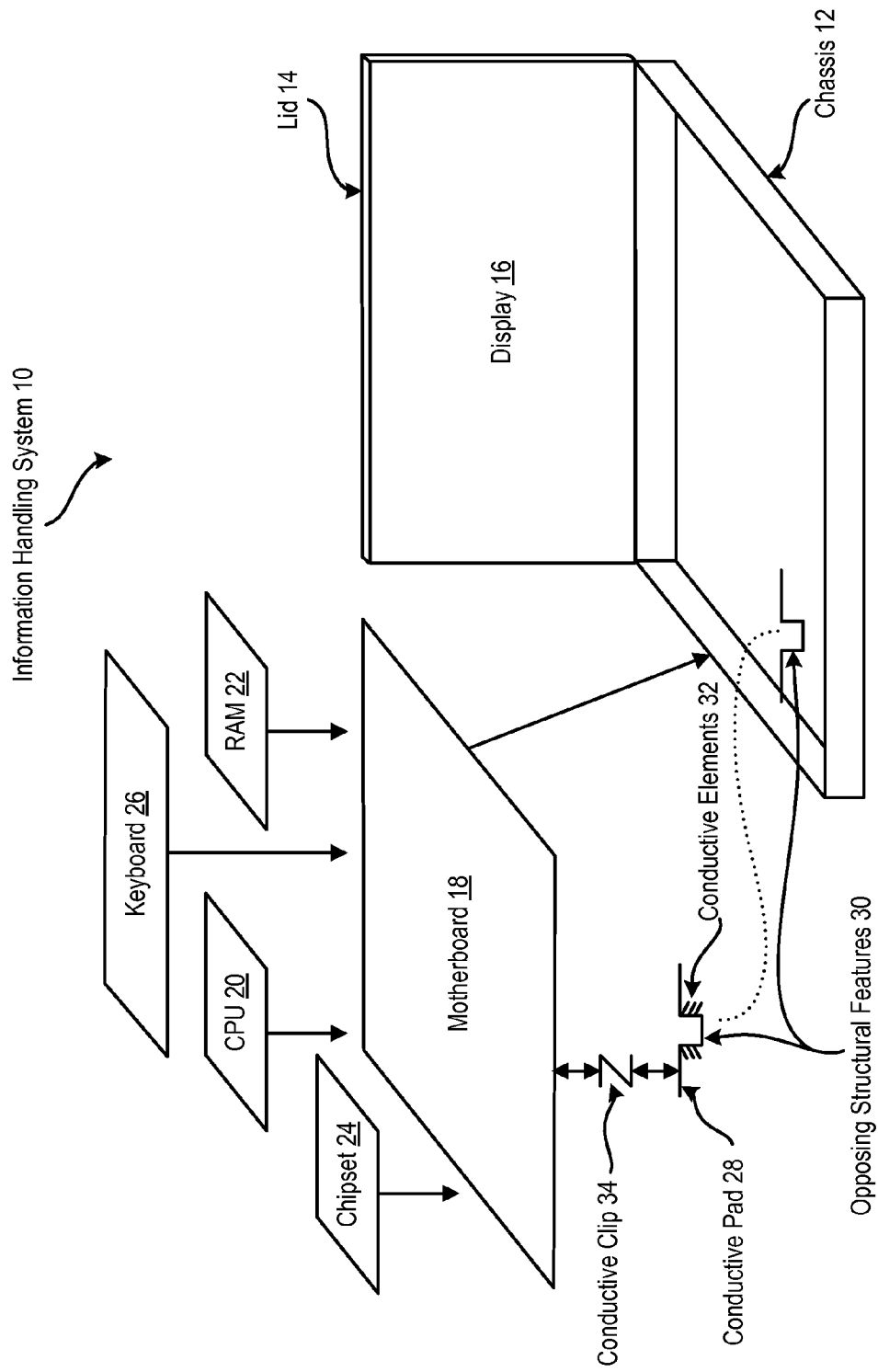

SYSTEM AND METHOD FOR ELECTRICAL COMMUNICATION THROUGH A NON-CONDUCTIVE INFORMATION HANDLING SYSTEM CHASSIS SURFACE

BACKGROUND OF THE INVENTION

1. Field of the Invention

The present invention relates to the field of information handling system chassis, and more particularly to a system and method for electrical communication through a non-conductive information handling system chassis surface.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a variety of components provided by a variety of suppliers. Generally the components are built into a chassis which serves the dual purpose of protecting the components in a solid structure and providing shielding of electromagnetic radiation produced by the components. For example, a metallic chassis provides support against physical damage that might occur to components if the chassis is dropped or bumped. A metallic chassis also creates a Faraday cage to provide effective containment of electromagnetic radiation generated within the chassis. Often, an information handling system chassis is built from a number of metallic parts that are assembled during the manufacture process. When multiple metallic parts are used to build the chassis, the separate pieces are typically electrically connected with each other in order to provide electromagnetic shielding by the assembled parts. For example, metal grounding clips are connected between different chassis parts so that electrical energy flows between the surfaces of each chassis part.

Information handling system chassis are built from a variety of metals and alloys. One metal that has gained acceptance for use in information handling system chassis is magnesium. Magnesium offers light weight and a hard surface that resists scratches and other damage, qualities that are desirable in portable information handling systems. One disadvantage with magnesium is that it tends to oxidize rapidly. To address oxidation, magnesium chassis components are typically treated prior to painting. Generally, heavy metal passivation techniques have been abandoned in favor of more environmentally friendly techniques, such as phosphate passivation treatment. However, conventional passivation treatment techniques tend to reduce the conductive properties along the surface of the magnesium. For example, one type of passivized magnesium has resistance of approximately 410 Milliohm while unpassivized magnesium has resistance of approximately 5.3 Milliohms. In order to provide effective electromagnetic suppression, a chassis surface should have resistance of less than 30 Milliohms. Although magnesium surface conductivity may be increased by other techniques, such as chromium pickling, plating and spray-on conductive coatings, such techniques tend to be costly and environmentally unfriendly both in the application of the materials at manufacture and the recycling of materials at end of use. Conductive gaskets typically have little success establishing electrical communication with a magnesium chassis. Conductive clips typically need substantial physical force to establish electrical communication and, once established, expose the magnesium surface to oxidation.

SUMMARY OF THE INVENTION

Therefore a need has arisen for a system and method which provides electrical communication through a non-conductive information handling system chassis surface.

In accordance with the present invention, a system and method are provided which substantially reduce the disadvantages and problems associated with previous methods and systems for establishing electrical communication through a non-conductive information handling system chassis surface. A conductive pad and chassis couple to each other with opposing structural features. Conductive elements formed on one structural feature establish electrical communication between the conductive pad and the chassis as the conductive pad couples to the chassis.

More specifically, a protruding element couples to a receiving element, each formed on opposing locations of a chassis and a conductive pad. Conductive elements formed on one of the opposing locations bites through the non-conductive surface of the other so that electrical communication is established. Conductive elements are, for instance, friction finger elements or friction ridge elements that act to couple the conductive pad to the chassis. Once electrical communication is established between the conductive pad and the chassis, processing components may couple to the conductive pad, such as for grounding. For example, a conductive clip couples to the conductive pad at one end and a motherboard at another end so that processing components coupled to the motherboard can ground to the chassis.

The present invention provides a number of important technical advantages. One example of an important technical advantage is that electrical communication through a magnesium chassis non-conductive surface is established for grounding processing components to the chassis for improved electromagnetic shielding of an information handling system. Engaging a protruding element into a receiving element provides a convenient location for conductive metal of a conductive pad to securely couple with the chassis by biting through the non-conductive surface of the chassis so that components electrically coupled to the conductive pad will have electrical communication with the chassis. The location of the protruding element and receiving element on either the chassis or the conductive pad provides flexibility in chassis design and casting while the conductive pad may be formed in a variety of shapes and sizes to accommodate restrictions in the placement and implementation of grounding structures.

BRIEF DESCRIPTION OF THE DRAWINGS

The present invention may be better understood, and its numerous objects, features and advantages made apparent to FIG. 1 depicts a blown-up perspective view of a portable information handling system.

DETAILED DESCRIPTION

Figure 2A:
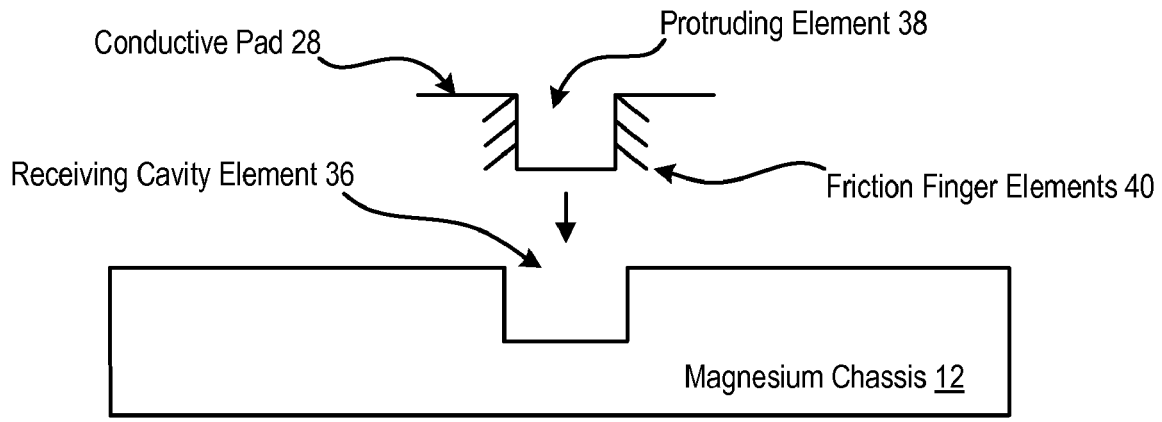
FIGS. 2A and 2B depict a side view of opposing structural features having a receiving cavity element formed in an information handling system chassis and a protruding element formed in a conductive pad.

A non-conductive surface of an information handling system chassis has electrical communication with processing components within the chassis through a conductive pad coupled with the chassis by opposing structural features of the chassis and the conductive pad. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a blown-up perspective view depicts a portable information handling system 10. A chassis 12 has a rotationally coupled lid 14 that contains a display 16 which presents information as visual images when lid 14 rotates to an open position. Chassis 12 has an interior sized to contain a plurality of processing components which cooperate to process information. For example, a motherboard 18 fits within the interior of chassis 12 and accepts a CPU 20 that performs primary processing functions, RAM 22 that stores information used in processing and a chipset 24 that runs firmware to manage interactions between hardware components. A keyboard 26 fits over the interior of chassis 12 to cover the processing components and to accept inputs from end users.

Chassis 12 is made of a conductive metal that hardens during formation to have a non-conductive surface, such as magnesium. In order to have adequate electromagnetic shielding, the processing components are grounded to chassis 12. Grounding of the processing components with chassis 12 uses electrical communication so that the coupling of a grounding lead to chassis 12 requires penetration through the non-conductive magnesium surface to the conductive material beneath the non-conductive surface. In order to obtain electrical communication between the processing components and chassis 12, a conductive pad 28 couples to chassis 12 by opposing structural features 30. For example, a protrusion formed in one of conductive pad 28 or chassis 12 fits into a cavity formed in the other of conductive pad 28 or chassis 12. Conductive elements 32 formed on either the protrusion or the cavity bite through the non-conductive surface of chassis 12 during insertion of the protrusion into the cavity so that conductive pad 28 acquires electrical communication with chassis 12 beneath the non-conductive surface. Once conductive pad 28 couples with chassis 12, a conductive clip 34 or other conductive coupling technique is used to couple processing components to conductive pad 28, thus providing electrical communication with chassis 12 for grounding of the processing components.

Figure 2B:
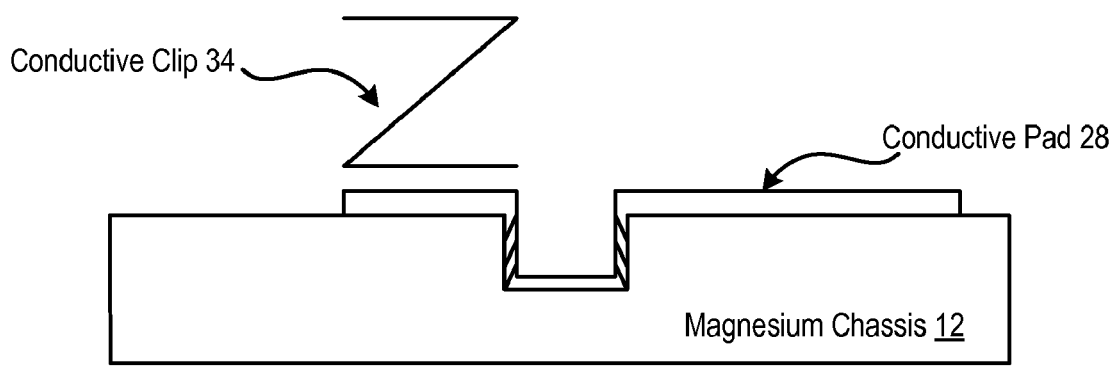
Figure 3A:
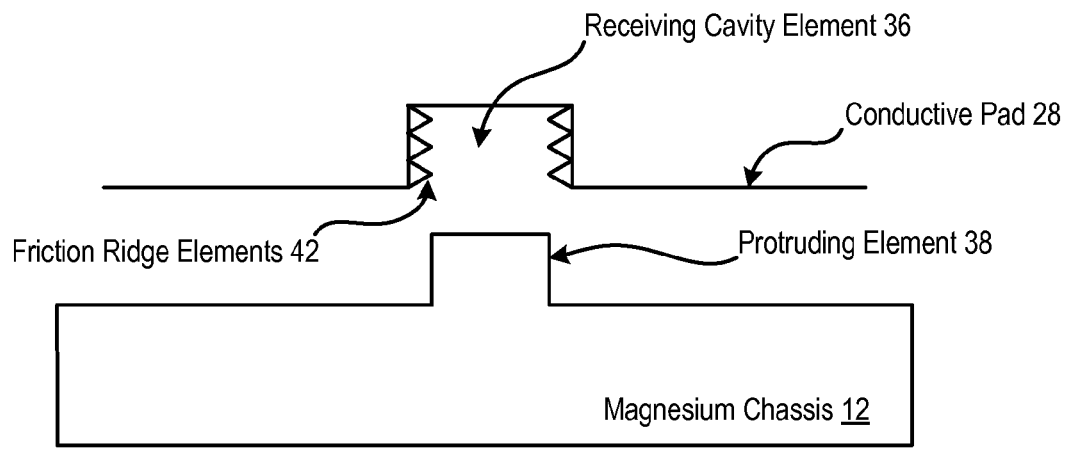
FIGS. 3A and 3B depict a side view of opposing structural features having a protruding element formed in formed in an information handling system chassis and a receiving cavity element formed in a conductive pad.
Figure 3B:
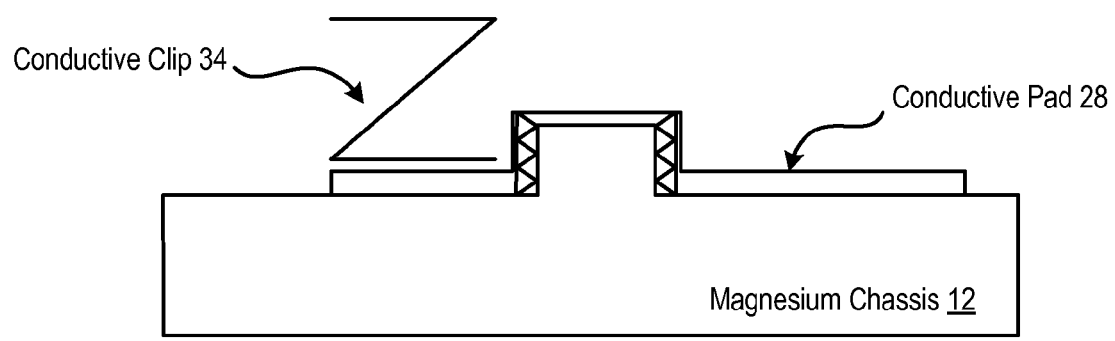

Referring now to FIGS. 2A and 2B, a side view depicts opposing structural features having a receiving cavity element 36 formed in an information handling system chassis and a protruding element 38 formed in a conductive pad. Protruding element 38 has friction finger elements 40 that extend outward to a diameter greater than the diameter of receiving cavity element 36. Protruding element 38 is sized to fit into receiving cavity element 36 so that friction finger elements 40 bite through the non-conductive surface of chassis 12 to establish electrical communication with the chassis material beneath the non-conductive surface. FIG. 2A depicts protruding element 38 aligned to couple into receiving cavity element 36. FIG. 2B depicts conductive pad 28 coupled to chassis 12 and held in place by friction finger elements 40, Referring now to FIGS. 3A and 3B, a side view depicts opposing structural features having a protruding element 38 formed in an information handling system chassis 12 and a receiving cavity element 36 formed in a conductive pad 28. Electrical communication between conductive pad 28 and chassis 12 is established by friction ridge elements 42 formed along the inner surface of receiving cavity element 36. As conductive pad 28 is pushed onto protruding element 38, friction ridge elements 42 bite through the non-conductive surface of chassis 12 to establish electrical communication between chassis 12 and conductive pad 28. FIG. 3A depicts conductive pad 28 aligned to couple to chassis 12. FIG. 3B depicts conductive pad 28 coupled to chassis 12 and held in place by friction ridge elements 42. The proportions, type and location of conductive elements 32 may be selected in part padd on the type of material used to fabricate conductive pad 28, such as tin, nickel, copper, bronze and steel.

Figure 4A:
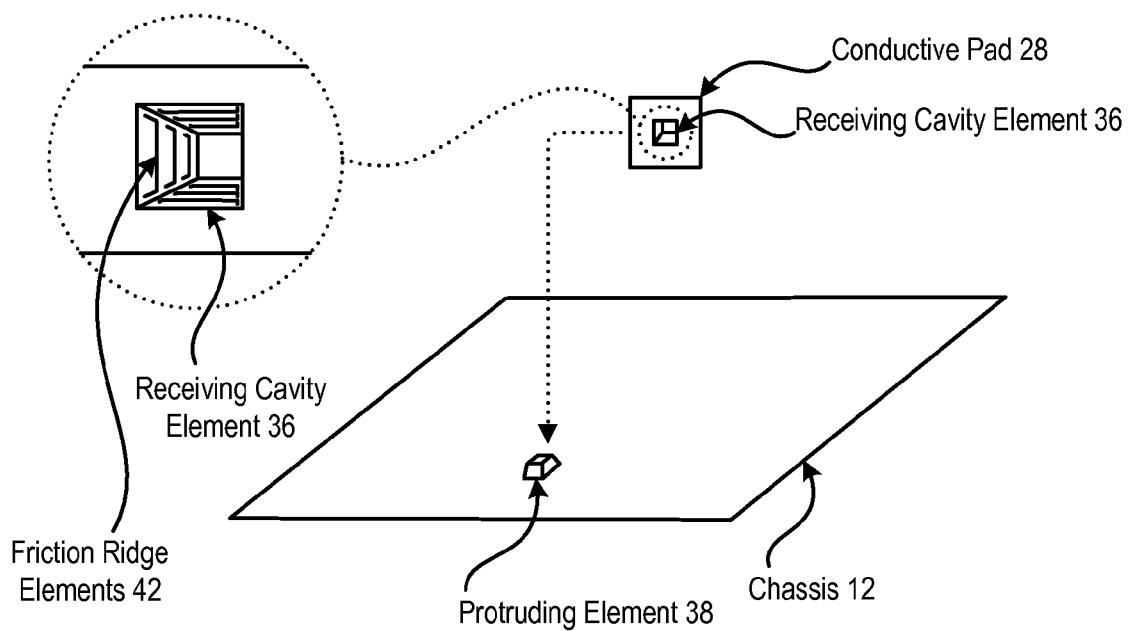
FIGS. 4A and 4B depict a perspective view of installation of a conductive pad on an information handling system chassis with opposing structural features.
Figure 4B:
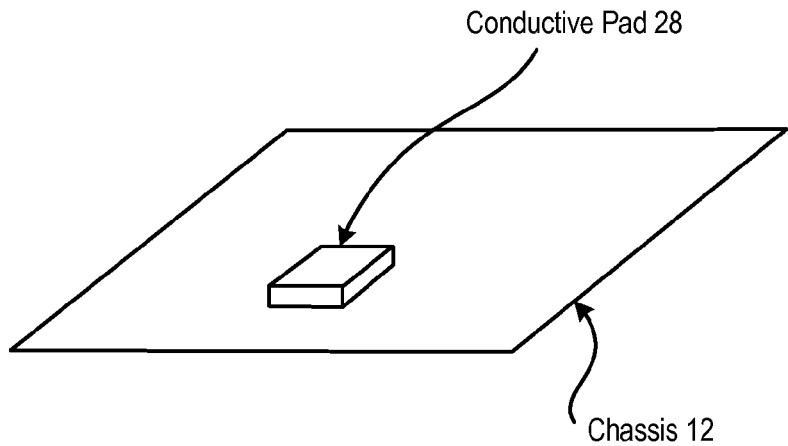

Referring now to FIGS. 4A and 4B, a perspective view depicts installation of a conductive pad on an information handling system chassis with opposing structural features. FIG. 4A depicts a conductive pad 28 over top of chassis 12 ready for installation. Friction ridge elements 42 formed within receiving cavity element 36 form an opening that is slightly smaller than protruding element 38. When conductive pad 28 is aligned over protruding element 38 and pushed down onto protruding element 38, friction ridge elements 42 bite and scrape through the non-conductive surface of chassis 12 to create electrical communication between conductive pad 28 and the conductive material within chassis 12 beneath the non-conductive surface. FIG. 4B depicts conductive pad 28 installed on chassis 12. Friction ridge elements 42 lock conductive pad 28 in place to provide a grounding point for the information handling system.

Although the present invention has been described in detail, it should be understood that various changes, substitutions and alterations can be made hereto without departing from the spirit and scope of the invention as defined by the appended claims.

What is claimed is:

1. An information handling system comprising:
    a metallic chassis operable to support processing components, the metallic chassis having a non-conductive surface;
    plural processing components disposed in the chassis, the processing components operable to process information; and
    a conductive pad operable to conduct electricity, the conductive pad in electrical communication with at least one of the processing components;
    wherein the metallic chassis and conductive pad have opposing structural features sized to fit into each other with one or more conductive elements extending between the opposing structural features to establish electrical communication between the conductive pad and the metallic chassis through the metallic chassis non-conductive surface; and
    wherein the opposing structural features comprise a protrusion extending from the conductive pad and a cavity formed in the metallic chassis, the protrusion sized to fit in the cavity, and wherein the conductive elements comprise friction elements extending from the protrusion to bite through the non-conductive surface during an insertion of the protrusion into the metallic chassis.

2. The information handling system of claim 1 wherein the metallic chassis comprises magnesium.

3. The information handling system of claim 2 wherein the conductive pad comprises steel.

4. The information handling system of claim 2 wherein the conductive pad comprises tin.

5. The information handling system of claim 2 wherein the conductive pad comprises nickel.

6. The information handling system of claim 2 wherein the conductive pad comprises copper.

7. The information handling system of claim 1 wherein the friction elements comprise fingers extending from the protrusion.

8. The information handling system of claim 1 wherein the friction elements comprise ridges extending from the protrusion.

9. The information handling system of claim 1 wherein the opposing structural features comprise a protrusion extending from the metallic chassis and a cavity formed in the conductive pad, the protrusion sized to fit in the cavity, and wherein the conductive elements comprise friction elements extending from the cavity to bite through the non-conductive surface during an insertion of the protrusion into the conductive pad.

10. A method for electrical communication through an information handling system chassis having a non-conductive surface, the method comprising:
    forming opposing structures in the chassis and a conductive pad;
    coupling the opposing structures together; and
    forcing conductive elements associated with the conductive pad structure to penetrate through the non-conductive surface of the chassis structure during the couplings;
    wherein the opposing structural features comprise a protrusion extending from the conductive pad and a cavity formed in the metallic chassis, the protrusion sized to fit in the cavity, the conductive elements comprising friction elements extending from the protrusion to bite through the non-conductive surface during an insertion of the protrusion into the metallic chassis.

11. The method of claim 10 wherein the chassis non-conductive surface comprises magnesium.

12. The method of claim 10 wherein the conductive elements comprise ridges extending from the conductive pad structure.

13. The method of claim 10 wherein the conductive pad structure comprises a protrusion and the chassis structure comprises a cavity.

14. The method of claim 10 wherein the chassis structure comprises a protrusion and the conductive pad structure comprises a cavity.

15. The method of claim 10 further comprising coupling a processing component ground to the conductive pad.

16. A system for electrical communication through an information handling system chassis having a non-conductive surface, the system comprising:
    a conductive pad;
    a protruding element formed in one of the chassis or the conductive pad;
    a receiving element formed in the other of the chassis or the conductive pad; and
    conductive elements formed in one of the chassis or the conductive pad;
    wherein the conductive elements electrically couple the protruding element and the receiving element to provide electrical communication from the conductive pad through the non-conductive surface; and
    wherein the conductive elements comprise conductive metal extending from the protrusion by a distance adequate to engage with the cavity during insertion of the protrusion into the cavity.

17. A system for electrical communication through an information handling system chassis having a non-conductive surface, the system comprising:
    a conductive pad;
    a protruding element formed in one of the chassis or the conductive pad;
    a receiving element formed in the other of the chassis or the conductive pad; and
    conductive elements formed in one of the chassis or the conductive pad;
    wherein the conductive elements electrically couple the protruding element and the receiving element to provide electrical communication from the conductive pad through the non-conductive surface; and
    wherein the conductive elements comprise conductive metal extending from the cavity by a distance adequate to engage with the protrusion during insertion of the protrusion into the cavity.

* * * * *